US011109308B2

(12) United States Patent
Barany

(10) Patent No.: US 11,109,308 B2
(45) Date of Patent: Aug. 31, 2021

(54) CONNECTED VEHICLE BANDWIDTH-BASED NETWORK SELECTION

(71) Applicant: Faraday&Future Inc., Gardena, CA (US)

(72) Inventor: Peter A. Barany, Rancho Palos Verdes, CA (US)

(73) Assignee: Faraday&Future Inc., Gardena, CA (US)

( * ) Notice: Subject to any disclaimer, the term of this patent is extended or adjusted under 35 U.S.C. 154(b) by 0 days.

(21) Appl. No.: 16/554,488

(22) Filed: Aug. 28, 2019

(65) Prior Publication Data

US 2020/0077328 A1 Mar. 5, 2020

Related U.S. Application Data

(60) Provisional application No. 62/723,865, filed on Aug. 28, 2018.

(51) Int. Cl.
| | |
|---|---|
| *H04W 48/18* | (2009.01) |
| *H04W 4/40* | (2018.01) |
| *H04L 12/14* | (2006.01) |
| *H04W 4/24* | (2018.01) |
| *H04W 48/16* | (2009.01) |

(52) U.S. Cl.
CPC ......... *H04W 48/18* (2013.01); *H04L 12/1489* (2013.01); *H04W 4/24* (2013.01); *H04W 4/40* (2018.02); *H04W 48/16* (2013.01)

(58) Field of Classification Search
CPC ......... H04W 48/18; H04W 4/40; H04W 4/24; H04W 48/16; H04W 84/005; H04W 12/001; H04W 28/0215; H04W 28/06; H04W 36/0009; H04W 36/08; H04W 40/02; H04W 40/20; H04W 48/02; H04W 48/06; H04W 4/00; H04W 4/10; H04W 52/12; H04W 52/143; H04W 52/225; H04W 52/241; H04W 52/346; H04W 72/0406; H04W 72/042; H04W 72/0493; H04W 76/45; H04W 80/02; H04W 84/12; H04W 88/06; H04W 8/06; H04W 8/08; H04W 8/26; H04W 92/18; H04L 12/1489;

(Continued)

(56) References Cited

U.S. PATENT DOCUMENTS

| | | | |
|---|---|---|---|
| 8,848,608 B1 * | 9/2014 | Addepalli | H04W 72/0406 370/328 |
| 2005/0090275 A1 * | 4/2005 | Wang | H04W 48/18 455/512 |

(Continued)

*Primary Examiner* — Nathan S Taylor
(74) *Attorney, Agent, or Firm* — Knobbe Martens Olson & Bear LLP

(57) ABSTRACT

Generally described, one or more aspects of the present application correspond to techniques for dynamic management of the network used for data transfer between a connected vehicle and a remote computing system. For example, during navigation a connected vehicle may switch between connections to a number of different networks, and the pricing of these networks may be periodically recalculated based on current network load. The disclosed techniques can select from among available networks to dynamically optimize the cost of data transfer, even as a vehicle navigates through different networks and as network pricing is changed.

10 Claims, 5 Drawing Sheets

(58) Field of Classification Search
CPC .......... G06F 21/45; G06F 3/017; G06F 3/167; G06F 9/542
See application file for complete search history.

(56) References Cited

U.S. PATENT DOCUMENTS

| | | | |
|---|---|---|---|
| 2005/0255856 A1* | 11/2005 | Griffin | H04W 36/0083 455/456.1 |
| 2010/0041397 A1* | 2/2010 | Chutorash | H04W 48/18 455/432.1 |
| 2012/0015655 A1* | 1/2012 | Lee | H04W 8/02 455/435.1 |
| 2013/0219039 A1* | 8/2013 | Ricci | H04L 43/0876 709/223 |
| 2013/0304616 A1* | 11/2013 | Raleigh | G06Q 20/145 705/34 |
| 2013/0322329 A1* | 12/2013 | Visuri | H04W 48/16 370/328 |
| 2015/0026312 A1* | 1/2015 | Othmer | H04W 48/18 709/220 |
| 2016/0150451 A1* | 5/2016 | Barreto De Miranda Sargento | H04W 36/14 370/332 |
| 2019/0283709 A1* | 9/2019 | Lu | H04N 7/188 |
| 2020/0053577 A1* | 2/2020 | Sundar | H04W 4/44 |
| 2020/0219334 A1* | 7/2020 | Emmerling | B60R 25/403 |

\* cited by examiner

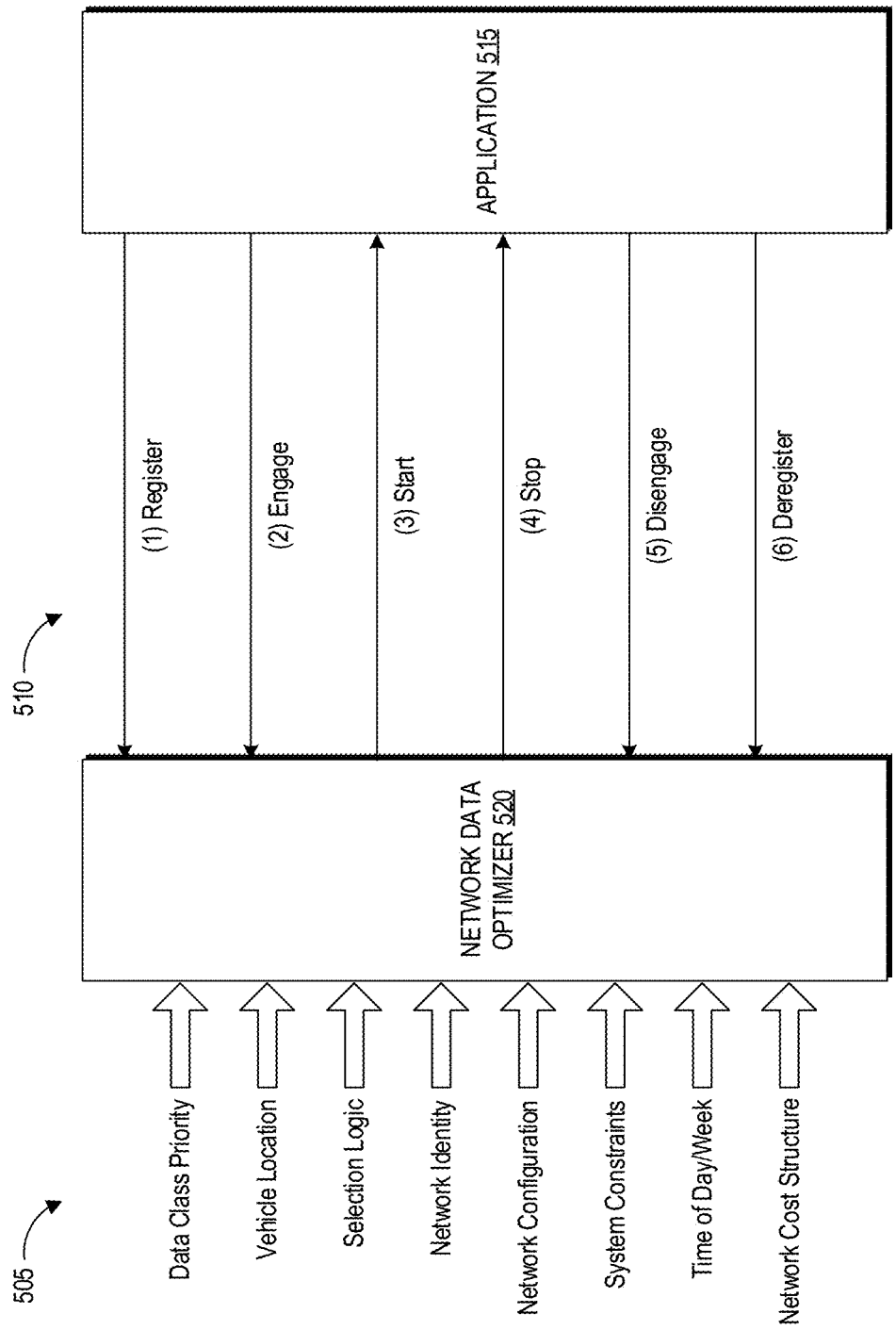

CONNECTED VEHICLE BANDWIDTH-BASED NETWORK SELECTION

CROSS-REFERENCE TO RELATED APPLICATIONS

This application claims the benefit of U.S. Provisional Application No. 62/723,865, filed Aug. 28, 2018, the entirety of which is hereby incorporated by reference.

TECHNICAL FIELD

The systems and methods disclosed herein are directed to connected vehicles, and, more particularly, to a method of optimizing connected vehicle data transfer by selecting from among available networks.

BACKGROUND

Vehicle connectivity platforms have arisen with the emergence of connected infotainment systems (e.g., connected navigation, social media, music streaming, and in-car WiFi) and the accompanying vehicle applications. A connected vehicle can use any of a number of different communication technologies to communicate with computing devices within the vehicle, other vehicles on the road, roadside infrastructure, and remote computing resources. For example, data can be transmitted from or received by a connected vehicle over networks including Bluetooth, satellite connections, WiFi, and 4G/5G.

SUMMARY

The connected vehicle network connection management techniques disclosed herein have several features, no single one of which is solely responsible for its desirable attributes. Without limiting the scope as expressed by the claims that follow, certain features of the network connection management will now be discussed briefly. One skilled in the art will understand how the features of the disclosed network connection management provide several advantages over traditional systems and methods.

One aspect relates to a connected vehicle, comprising at least one transceiver configured to connect to wireless networks; and a computing system configured to execute a network connection manager, wherein the network connection manager is configured by computer-executable instructions to at least identify at least first and second wireless networks that are available for the connected vehicle to use for transferring data; receive first differentiated pricing information from the first wireless network, the first differentiated pricing information indicating a first cost of transferring data over the first wireless network, the first cost determined based on a current load on the first wireless network; receive second differentiated pricing information from the second wireless network, the second differentiated pricing information indicating a second cost of transferring data over the second wireless network, the second cost determined based on a current load on the second wireless network; identify, based on the first and second costs, which one of the first and second wireless networks that corresponds to a lowest cost; and configure the at least one transceiver to transfer data over the one of the first and second wireless networks that corresponds to the lowest cost.

In some implementations, the network manager can be configured to at least configure the at least one transceiver at a first time; determine, at a second time after the first time, that the first and second wireless networks are still available for the connected vehicle to use for transferring data; receive updated differentiated pricing information from one or both of the first and second wireless networks; determine, based on the updated differentiated pricing information, which of the first and second networks corresponds to the lowest cost at the second time; and reconfigure the at least one transceiver to transfer data over the one of the first and second wireless networks that corresponds to the lowest cost at the second time.

In some implementations, the network manager can be configured to at least continue to identify and analyze pricing of various wireless networks that become available as the connected vehicle navigates along a route; and at various points in time, select from among the various wireless networks based on current differentiated pricing information.

Another aspect relates to a computer-implemented method, comprising receiving differentiated pricing information from a plurality of wireless networks that are available for a connected vehicle to use for transferring data, the differentiated pricing information for a particular wireless network determined based on a current load on the particular wireless network and indicating a cost of transferring data over the particular wireless network; based on the differentiated pricing information, selecting a wireless network from among the plurality of wireless networks that corresponds to a lowest cost; and configuring the connected vehicle to transfer data over the selected wireless network that corresponds to the lowest cost.

Some implementations can further comprise causing transfer of data over the selected wireless network. Some implementations can further comprise receiving updated differentiated pricing information from at least one of the plurality of wireless networks or a new wireless networks; based on the updated differentiated pricing information, selecting an updated wireless network that corresponds to the lowest cost; and continuing the transfer of data using the updated wireless network.

BRIEF DESCRIPTION OF THE DRAWINGS

FIG. 5 depicts a block diagram of an example network data optimizer that can use pricing information from the connection manager of FIG. 2 for managing data transfer timing.

DETAILED DESCRIPTION

Figure 1:
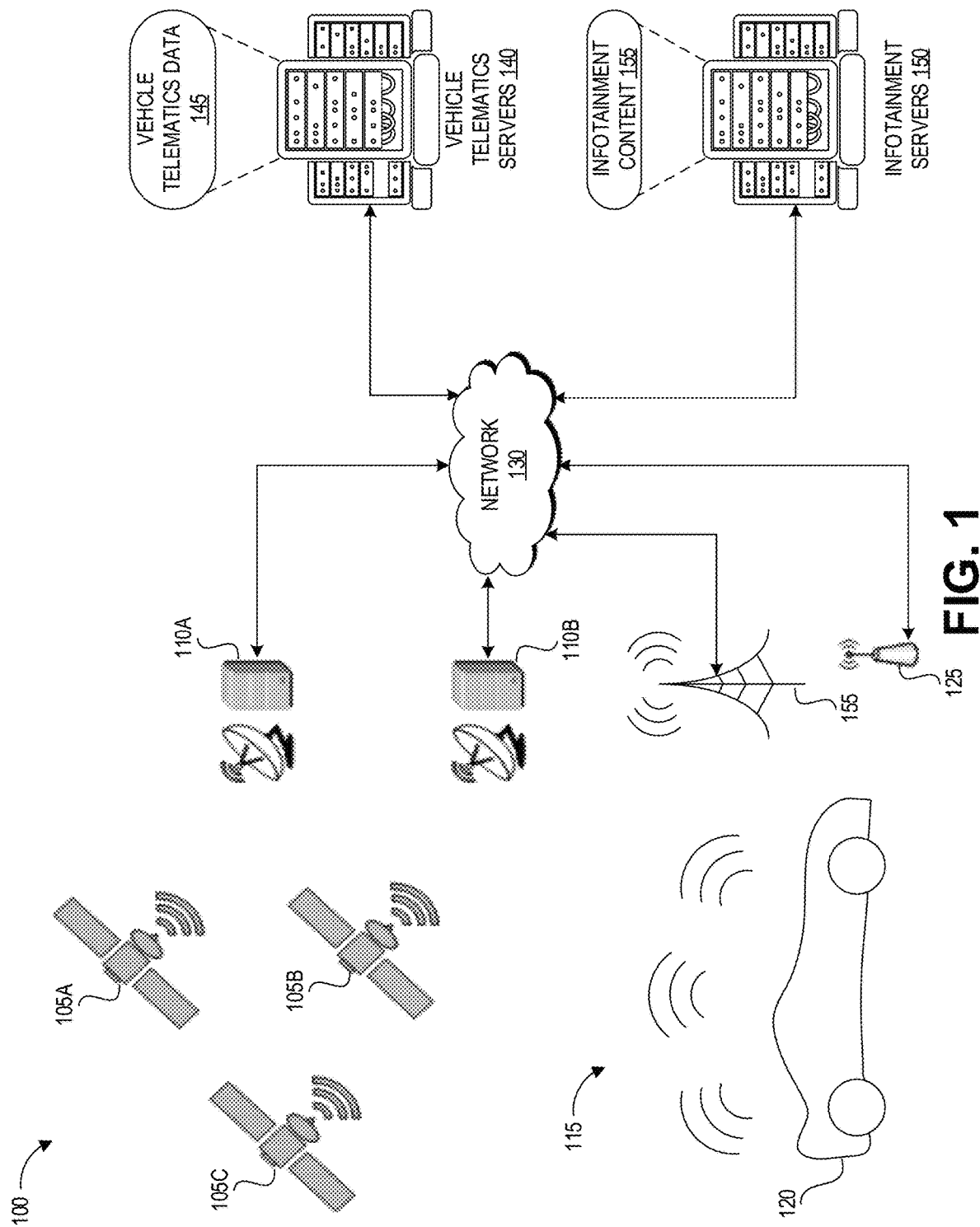
FIG. 1 depicts a schematic diagram of a networked connected vehicle communication environment in which various embodiments according to the present disclosure can be implemented.

Generally described, the present disclosure relates to the dynamic management of network selection for data transfer to and from a connected vehicle, for example based on changing pricing of a number of available networks. A connected vehicle can generate significant amounts of manufacturer-specific vehicle diagnostics and performance data that the vehicle manager may wish to collect and analyze. Connected vehicles can also receive software images, applications and calibration settings via over-the-air updates. These vehicle manager bulk data transfers typically use WiFi, cellular data (e.g., 4G/LTE), or satellite connection networks (referred to collectively herein as "wireless networks"). In addition, user-initiated data transfers such as streaming music, voice searches, web browsing, and the like can also use such wireless networks. Thus, a connected vehicle can be transferring data as it is navigating from place to place, and a connected vehicle often travels through many different networks as it navigates.

The price of using a particular network for data transfer can vary based on a number of factors including time of day, day of week, access location, and the like. Further, some or all networks available to a connected vehicle at a given point during navigation may vary price based on bandwidth, referred to herein as a differentiated pricing scheme. For example, when bandwidth for a specific radio access technology ("RAT") and/or service provider is over-subscribed/over-used (e.g., during busy hours or even as granular as hundreds of milliseconds time periods), differentiated pricing can set higher relative prices for data connectivity. Conversely, when bandwidth for a specific RAT and/or service provider is under-subscribed (e.g., during non-busy hours or other time periods), differentiated pricing information can set lower relative prices for data connectivity. These prices can be broadcast to devices as described herein for use in determining which network to use, from among the available networks. This information can also be made available to servers via a wireless or wired connection. Users may "lock in" at the rate set at the time of their access, or may experience fluctuating costs for continued access based on updated bandwidth and pricing analysis. Accordingly, the cost of transferring data to or from a connected vehicle may fluctuate based on current bandwidth of various networks, as the vehicle navigates and connects/disconnects with various networks along its route.

The aforementioned problems, among others, are addressed in some embodiments by the disclosed techniques for dynamically managing the network used for transferring data. For example, the connected vehicle can analyze the differentiated pricing information broadcast to it from available networks, and can select which network to use based on this pricing information. In some examples, the vehicle may select a lowest-cost network, and then may monitor new pricing information (for existing networks or newly available networks) to determine whether a less costly network is available. If so, the vehicle can switch to the less costly network. If not, the vehicle can continue using the currently selected network until it is no longer available or until a less costly network becomes available.

Additional aspects of the present disclosure may use the above-described differentiated pricing information to manage the timing of data transfers. For example, certain classes of data may be delivered in real time (e.g., as a user of the vehicle is interacting with the vehicle applications), such as user-requested streaming of media content and real-time navigation. However, transfer for other classes of data may be deferred, either until a specific deadline or indefinitely. For such data classes, the disclosed techniques can use predictive analysis to identify a point in time during the acceptable data transfer window at which the data transfer cost is expected to be low (or the lowest). In addition, the predictive analysis can identify times at which the cost of data transfer is expected to increase, for example raising before again lowering. These predictions can be used to drive the timing of data transfer starts and stops.

Some implementations may use predictive logic to determine start and stop timings for data transfers to minimize cost while complying with timing requirements, as described herein. Some implementations can use a trained deep learning algorithm to predict the start and stop timings for data transfers to minimize cost while complying with timing requirements. These approaches are referred to herein as a "network data optimizer." The network data optimizer can receive a number of inputs to use in making start/stop timing predictions, including but not limited to time-of-day, time-zone, vehicle geo-position, available networks, business logic, network cost structures (including any business relationship modifiers), and the like. In some implementations, some or all vehicle applications can be programmed to comply with the start/stop timing recommendations output by the network data optimizer. In some implementations, some or all vehicle applications can be programmed to evaluate the timing recommendations and determine whether or not to comply. For example, vehicle manager applications can be programmed to comply, while user applications need not necessarily comply.

For example, during the course of driving, a connected vehicle may roam between multiple wireless networks, or may be simultaneously connected to multiple wireless networks, which could impose different costs on the vehicle manager. The cost of the data transfer could also differ by time of day, network load factors, business relationships between the vehicle manager and various network providers, and other factors. For example, some wireless carriers can have different rates for business hours (e.g., 9 AM-5 PM) and non-business hours (e.g., 5 PM-9 AM), with costs being lower during non-business hours. It can be cost-advantageous for the vehicle manager to defer the non-critical data transfers until after 5 PM. Another example is that a wireless carrier may charge a higher data price in an urban region than in a rural region that is just adjacent to the urban region. Hence, it can be cost-advantageous for the vehicle to defer non-critical data transfers until the vehicle enters the rural region. The disclosed predictive data transfer management can balance the goal of the vehicle manager to achieve the lowest possible cost for all their data transfers, while also complying with specified transfer timings or intervals for various data classes.

As would be appreciated by one of skill in the art, the use of dynamic network connection management techniques, as disclosed herein, represents a significant technological advance over prior implementations. Specifically, the disclosed techniques can enable a connected vehicle that has access to multiple wireless networks throughout the course of navigation to adaptively select from among those networks to optimize certain goals, while still complying with specified data transfer timing requirements. As such, the embodiments described herein represent significant improvements in computer-related technology.

As described herein, data transfer refers to both transmitting data from a connected vehicle over a network and receiving data at the connected vehicle over a network. Although certain examples discussed herein present the goal of minimizing cost of data transfer, it will be appreciated that the timing prediction techniques can be tuned to optimize one or more of various goals, including cost, reliability, and time of data transfer, usage of a particular type of network, and the like. As described herein, a "vehicle manager" can be the entity that designs, manufactures (or commissions manufacture of) the vehicle, and also makes use of the networked vehicle systems (e.g., for providing software/firmware updates, receiving vehicle diagnostic information, scheduling maintenance, etc.) after the vehicle is in use by a consumer. However, it will be appreciated that in some implementations the entity that makes use of the vehicle's networked systems as described herein may differ from the vehicle designer and/or manufacturer.

Various aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are to illustrate only, and are not intended to be limiting. For example, although described in the context of a connected vehicle, the disclosed data transfer optimization techniques can be implemented in other mobile networked computing environments.

Overview of Example Connected Vehicle and Network Environment

FIG. 1 depicts a schematic diagram of a networked connected vehicle communication environment 100 in which various embodiments according to the present disclosure can be implemented. FIG. 1 depicts a connected vehicle 120, which may be a car (as illustrated) or a truck, van, aerial vehicle, boat, train, or other vehicle. The vehicle 120 may be an electric vehicle in some implementations, or may be a hybrid vehicle, hydrogen vehicle, or combustion vehicle.

The vehicle 120 can be configured to establish a number of different types of wireless network connections 115, including satellite connections, cellular data connections, and WiFi connections. For example, the vehicle 120 can be equipped to connect to geosynchronous satellites 105A, low-earth orbit satellites 105B, global navigation satellite systems 105C, cellular base station transceivers 155 (e.g., for 3G, 4G, LTE, and/or 5G cellular network access), and WiFi access points 125, as they are available. In turn, the geosynchronous satellites 105A and low-earth orbit satellites 105B can communicate with gateways 110A, 110B that provide access to the network 130. The global navigation satellite systems 105C can communicate directly with the vehicle 120, for example to triangulate (or otherwise compute) its location. These various satellite, cellular, and WiFi network connections can be managed by different third-party entities, referred to herein as "carriers." The vehicle manager can be charged various pricing schemes by these carriers for usage of their networks for data transfer, as described herein.

The vehicle 120 can use these various connections 115 to communicate over network 130 with remote computing resources such as the vehicle telematics servers 140 and infotainment servers 150. The network 130 can include any appropriate network, including an intranet, the Internet, a cellular network, a local area network or any other such network or combination thereof. In the illustrated embodiment, the network 130 is the Internet. Protocols and components for communicating via the Internet or any of the other aforementioned types of communication networks are known to those skilled in the art of computer communications and thus, need not be described in more detail herein.

The vehicle telematics servers 140 can store and analyze vehicle telematics data 145, for example diagnostic data received from the vehicle 120 and other vehicles. In some implementations, the vehicle telematics servers 140 can be maintained and securely stored by the vehicle manager. Beneficially, analysis of the vehicle telematics data 145 can enable the vehicle manager to provide improved vehicle service, vehicle software and/or firmware upgrades, and aid in further vehicle design. Accordingly, the vehicle manager can desire for certain telematics data to be provided from the vehicle 120 to the vehicle telematics servers 140 at their own cost (e.g., without charging the owner or user of the vehicle 120). This data may be specified for transfer at predefined intervals, before certain deadlines, or without any data transfer timing limitations.

The infotainment servers 150 can store infotainment content 155, for example media that provides a combination of information and entertainment. This media can include, for example, music, movies, podcasts, news, and other broadcast material that may be of interest to vehicle users. This content can be provided on demand to users of the vehicle 120. This data may be provided at predefined intervals (e.g., sending predicted interesting news articles), or may be delivered in real-time (e.g., on demand as requested by a user). In some implementations, user-requested on-demand data may not be regulated using the disclosed network data optimization techniques, as the transfer start and stop may be dictated by a user of the vehicle.

Figure 2:
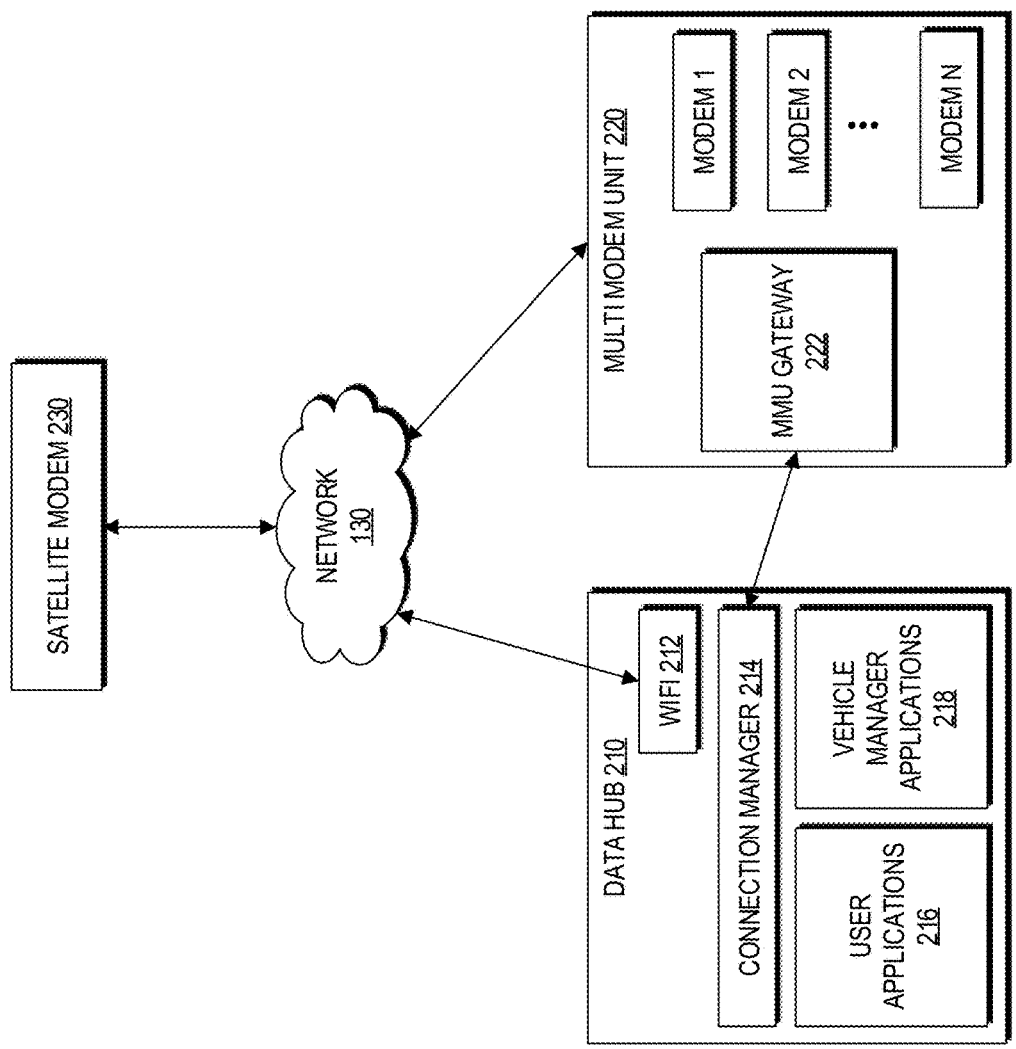
FIG. 2 depicts a block diagram of example networking components of the connected vehicle of FIG. 1, including a connection manager for implementing the disclosed techniques.

FIG. 2 depicts a block diagram of example networking components of the connected vehicle 120. In the illustrated embodiment, the data hub 210 and multi-modem unit 220 represent two computing components that can enable the vehicle 120 to connect to the network 130, for example via the satellites 105A, 105B and/or WiFi access point 125 of FIG. 1. Specifically, the data hub 210 includes a WiFi transceiver 212 that can be configured to identify and connect to available WiFi networks. The multi-modem unit 220 includes a number of different modems (modem 1, 2 . . . N) that can connect to various satellite and cellular networks, for example via satellite modem 230. The multi-modem unit gateway 222 can regulate communications sent along the modems, for example routing data packets to the appropriate modem, converting data formats, etc. As such, the vehicle 120 can be connected to multiple networks simultaneously, further enabling the disclosed techniques for optimizing network selection during data transfer.

The data hub 210 also includes a number of user applications 216, vehicle manager applications 218, and the connection manager 214. User applications 216 can include infotainment applications such as media streaming, real time traffic visualization, and network browsing, to name a few examples. Vehicle manager applications 218 can include software and firmware that manages and monitors vehicle systems, for example by performing diagnostics of various vehicle systems, maintaining vehicle software, and the like. The connection manager 214, as described herein, can actively manage which network connection to use for data transfer, in order to optimize specified network-usage goals (e.g., cost, reliability, and/or transfer speed). The connection manager 214 can include a module of computer-executable instructions stored in a memory that, when executed, cause at least one processor to perform the functions described herein for managing network connections.

Figure 3:
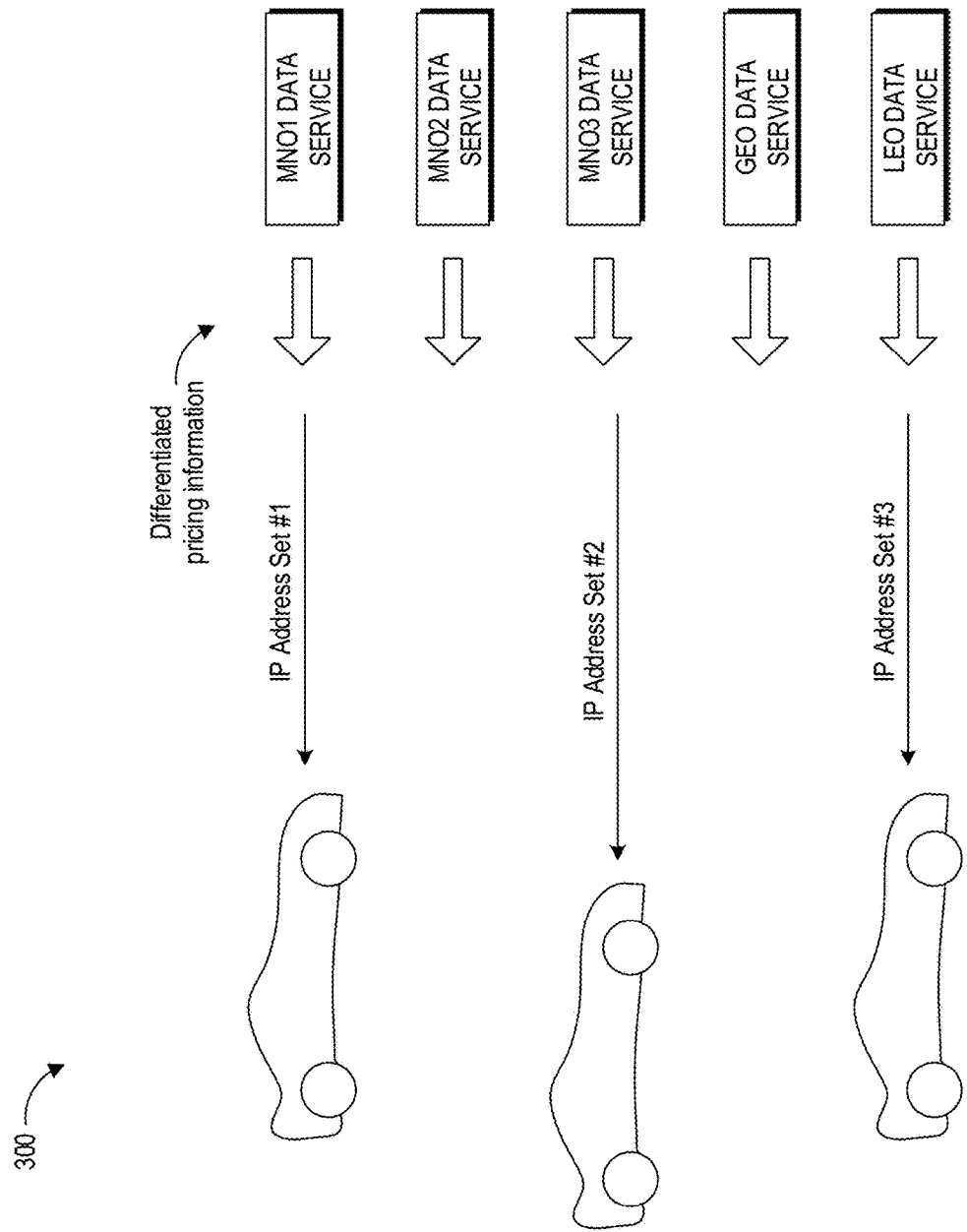
FIG. 3 is a graphical illustration of an environment in which the disclosed network connection management techniques can be implemented.

FIG. 3 is a graphical illustration of a navigational environment 300 in which the disclosed network connection management techniques can be implemented. FIG. 3 depicts three different mobile network operator ("MNO") data services, MNO1-MNO3, a geosynchronous ("GEO") satellite data service, and a low-earth orbit ("LEO") satellite data service each transmitting their differentiated pricing information to the vehicle 120 (among other vehicles and other computing devices). As described herein, this differentiated pricing information may reflect the current bandwidth/usage of a particular data service, and may be computed and transmitted at periodic or intermittent intervals such as every hour, every 30 minutes, every second, every 100 milliseconds, or dynamically as needed based on changes in network load.

The vehicle 120 can receive the differentiated pricing information from the data services based on its IP address. For example, some data services may broadcast their differentiated pricing information with or without a certain repetition frequency using a broadcast IP address and broadcast RAT mechanism. In this example, all vehicles within range will receive the information, represented by IP Address Set #1 in FIG. 3. Some data services may multicast their differentiated pricing information with or without a certain repetition frequency using a multicast IP address and multicast RAT mechanism. In this example, vehicles that are members of the multicast group will receive the information, represented by IP Address Set #2 in FIG. 3. Some data services may unicast their differentiated pricing information without a certain frequency. In this example, the data service transmits the information to a single vehicle (or individually to a number of vehicles) using a unicast IP address and unicast RAT mechanism. This is represented by IP Address Set #3 in FIG. 3.

Figure 4:
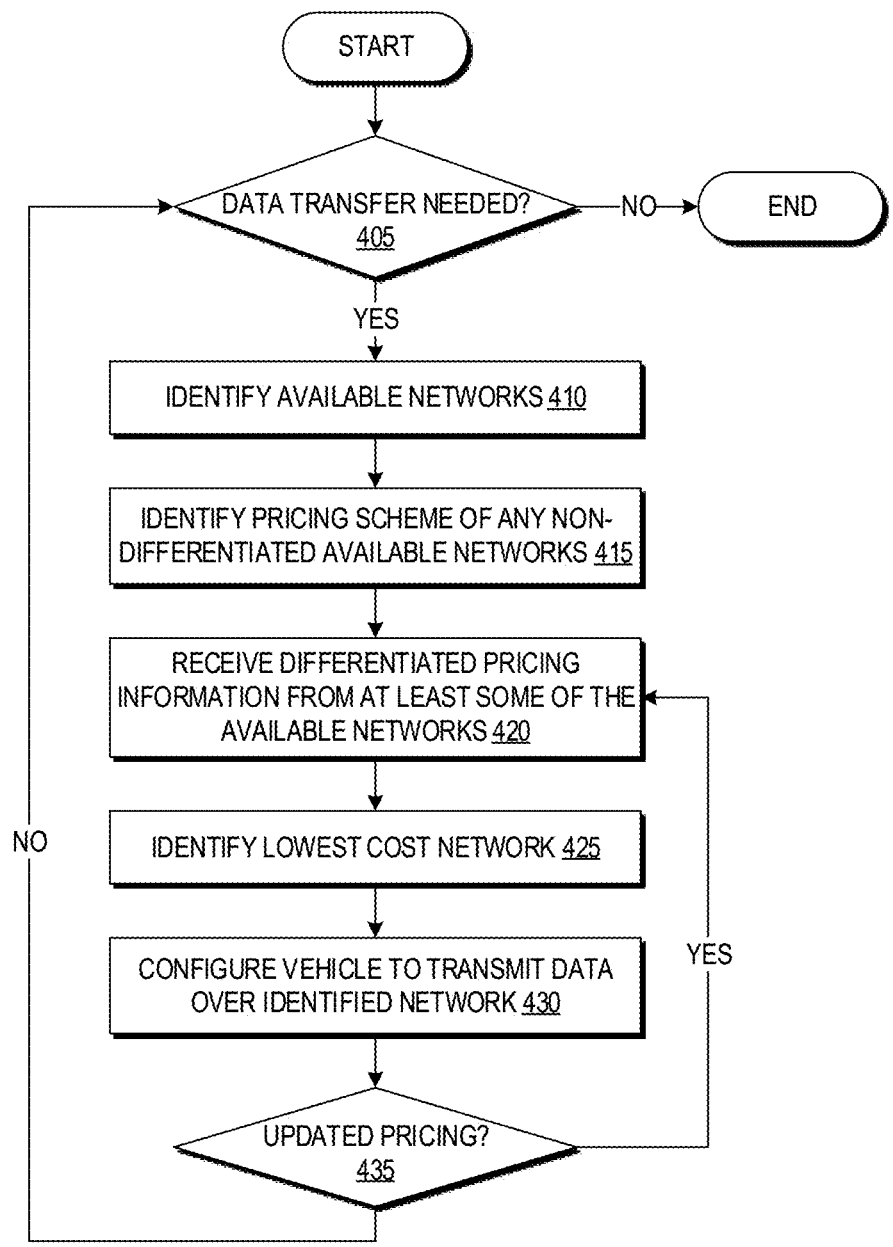
FIG. 4 depicts a flowchart of an example process for dynamic network selection, as described herein.

FIG. 4 depicts a flowchart of an example process 400 for dynamic network selection, as described herein. The process 400 can be implemented by the connection manager 214 or another suitable computing module. Although some examples provided herein focus on the context of a vehicle transferring data during navigation, it will be appreciated that the process 400 can also be implemented by a stationary vehicle to manage connections as pricing changes. The process 400 can also be implemented by a server, such as vehicle telematics servers 140.

At block 405, the connection manager 214 can determine whether data transfer is needed. For example, user applications 216 and/or vehicle manager applications 218 may be requesting to transmit or receive data. If there is no need for data transfer, the process 400 ends and may repeat again periodically or as initiated by data transfer requests. If there is a need for data transfer, the process 400 continues to determine which network to use for the data transfer.

At block 410, the connection manager 214 can identify available networks. As described above, one or more of a number of different types of networks may be available to the vehicle 120 at any given point in time. For example, the vehicle 120 can connect to WiFi, cellular data networks, and satellite networks, as available.

At block 415, the connection manager 214 can determine the pricing scheme of any non-differentiated available networks. For example, a user's home WiFi may provide "free" access to the vehicle (subject to the user's pricing terms with their home network provider), while the WiFi of a particular establishment may charge an access fee. As another example, some cellular or satellite networks may charge flat rates for a certain quantity of data transfer per time interval. The prices of these networks may still vary based, for instance, on time of day and day of week. As such, the connection manager 214 can determine the current pricing of available non-differentiated networks (if any).

At block 420, the connection manager 214 can receive differentiated pricing information from at least some of the available networks. As described herein, the differentiated pricing may be updated dynamically based on current network conditions, and these updated pricings can be transmitted to the vehicle 120 (e.g., as broadcast, multicast, or unicast transmissions as described with respect to FIG. 3).

At block 425, the connection manager 214 can analyze the determined and received pricing information to identify which network provides the lowest cost access at that point in time. At block 430, the connection manager can configure the vehicle to transmit data of this identified lowest-cost network, for example by designating the particular one of the WiFi transceiver 212 or modems 1-N that is connected to that network for use in data transfer. In some implementations, the others of the WiFi transceiver 212 or modems 1-N may remain active in order to search for and communicate with updated networks.

At decision block 430, the connection manager 214 can determine whether there is updated pricing. This block may be repeated periodically (or in response to receipt of new pricing transmissions) while data transfer continues in order to check whether a less costly network might be available. If no updated pricing is received and the data transfer completes, the process can loop to block 405 to determine whether continued analysis of network pricing is needed. If updated pricing information is received, then the connection manager 214 can loop back to block 420 to again analyze the updated differentiated pricing and identify a lowest-cost network.

Though FIG. 4 is presented in the context of minimizing network cost based on differentiated pricing information, other network parameters can be analyzed and optimized in other implementations. For example, some implementations may optimize network quality (e.g., to achieve the highest resolution video transfer, lowest latency in an interactive computing environment, or most reliable data transfer) by analyzing quality-related parameters of a network (e.g., bandwidth, historical transfer success rate, latency rate). In some implementations, a user of the vehicle may pay for the data that they transfer (e.g., infotainment, navigational data) and the vehicle manager may pay separately for the data that they transfer (e.g., vehicle telematics data, software updates). As such, the process 300 may be implemented separately and to optimize different network parameters for user-initiated data transfers and vehicle manager-initiated data transfers.

Overview of Example Network Data Optimizer

FIG. 5 depicts a block diagram of an of an example network data optimizer that can use pricing information from the connection manager 212 for managing data transfer timing. The depicted network data optimizer 520 can be a set of computer-executable instructions stored in one or more physical memories, implemented by one or more hardware processors, for example as a component of the data hub 210 to provide data transfer timing commands for the user applications 216 and/or vehicle manager applications 218. In some implementations, the instructions of the network data optimizer 520 can be periodically or intermittently updated via vehicle manager software update data transfers, as described herein.

FIG. 5 depicts an illustrative set of interactions 510 for management of data transfer timing, as described herein. These interactions 510 represent data communications between the network data optimizer 520 and a particular software or firmware application 515 that has (or expects to have) data to transfer. Though FIG. 5 only depicts a single application 515, it will be appreciated that the interactions 510 can occur between the network data optimizer 520 and some or all of the user applications 216 and vehicle manager applications 218. In some implementations, certain applications of the user applications 216 and vehicle manager applications 218 that implement real-time data transfers may not communicate with the network data optimizer 520.

At interaction (1), the application 515 registers with the network data optimizer 520. An application can register when its instructions indicate that it will have data to transfer (e.g., that it will have data to transmit from the vehicle, or that it has received an alert that it will receive a data transmission to the vehicle). This registration can include, for example, provision to the network data optimizer 520 of the data class, priority, data transfer deadline, and data transfer tolerance of the application 515. In this manner, each application 515 communicates their parameters to the network data optimizer 520. With respect to the data class, a class refers to a type or category of data (e.g., battery parameters, motor performance, tire pressure, and other vehicle diagnostic information; software updates, firmware upgrades, new software applications). The network data optimizer 520 can maintain a database of data classes and associated data priorities. The data priorities can be values representing the relative benefit or cost associated with transferring (or not transferring) the data. As an example, transmission of a new radio application to the vehicle may have a low priority, as it would not cause harm if it did not get to the vehicle user soon. However, transmission of battery parameters can have high priority, as remote analysis of the battery parameters could prevent electrical fault and/or real cost (e.g., vehicle damage, an unhappy user). In some implementations, the data priorities can be specified by a central authority or the vehicle manager and provided securely to the network data optimizer 520, such that a user of the vehicle and/or the application 515 are not able to access (or be aware of) the priorities of different data classes. For example, the {data class, priority value} pairings database can be encrypted, stored in a secure chip such as a trusted platform module (TPM), or stored in another suitable secure manner such that only the network data optimizer 520 is authorized to access the database. In some implementations, whenever the value of data exceeds the cost of the network, the network data optimizer 520 can send a "Start" signal to send it out. Whenever the cost of the network exceeds the value of the data, the network data optimizer 520 can send a "Stop" signal to stop the transfer.

With respect to the data transfer deadline and tolerance, the deadline refers to a recurring interval or known time at which data transfer from that application 515 is specified to occur, while the tolerance refers to an amount of time (or percentage of the interval) on either side of the deadline during which data transfer is acceptable. As a non-limiting example, a data class of "battery parameters" (e.g., battery charge level, battery temperature, discharge rate) can have a deadline of transfer at five minute intervals with a tolerance of plus or minus ten seconds. As such, the battery parameter data class can be transferred during a twenty second window occurring every five minutes. As another non-limiting example, a data class of "firmware upgrade" can have a deadline of "within the next week," with no associated interval. As another non-limiting example, a data class of "user interface update" can have a no deadline or associated interval. It will be appreciated that actual data classes and associated deadlines/intervals can vary from the provided examples. In response to registering, the application 515 can receive an identity or "handle" back from the network data optimizer 520, so that the network data optimizer 520 can send start and stop signals associated with that identifier.

At interaction (2), the application 515 can engage with the network data optimizer 520. For example, the application 515 can engage when it has data ready to transfer, or at the beginning of its applicable data transfer window. In scenarios where there is an applicable data transfer window, engagement of the application 515 can start a counter at the network data optimizer 520 corresponding to the length of the window. The application can remain engaged until the data is transferred or the expiry of the counter (at which point the data can be transferred), in some implementations.

At interaction (3), the network data optimizer 520 sends a "start" signal to the application 515 indicating that it should begin data transfer, for example when the right network (e.g., lowest cost, most reliable, fastest, etc.) is entered during the applicable window. At interaction (4), the network data optimizer 520 sends a "stop" signal to the application 515 indicating that it should stop data transfer, for example when the right network is exited. In some implementations no stop signal may be sent during the timeframe of data transfer. In some implementations, a stop signal may always be sent when the network changes to an unfavorable network. However, the application 515 may have already completed its data transfer before the stop signal is sent, in which case the stop signal does not require any action from the application 515. In some implementations two or more cycles of start/stop signals may be sent, such that the application 515 performs its data transfer in multiple chunks. The application 515 can be programmed to comply with the start and stop signals from the network data optimizer 520, or may be programmed to evaluate whether to proceed with start or stop despite the signals from the network data optimizer 520.

The network data optimizer 520 can be programmed to send start (and optionally stop and additional start signals) such that the application 515 is instructed to send its data packet during the specified timeframe (e.g., before expiry of the counter). In some implementations, this can factor in the size of the data packet and network transfer speeds, such that the application 515 is instructed to send its data to a destination (e.g., the vehicle telematics servers 140) such that it arrives at the destination during the specified timeframe.

At interaction (5), the application 515 disengages with the network data optimizer 520. The application 515 can disengage when its data transfer is complete. In some scenarios, after disengaging the application 515 can remain registered and return to interaction (2) to re-engage for another data transfer. This behavior can be exhibited, for example, by applications that have data to transfer periodically. In some scenarios, after disengaging the application 515 can initiate interaction (6) to deregister. Deregistration can cause the network data optimizer 520 to remove the application information from its memories. The application 515 may deregister, for example, if it has only a single data transfer scheduled for completion.

FIG. 5 also depicts example inputs 505 into the network data optimizer 520 for use in sending the start and stop signals. The inputs 505 can include data class priority (for the particular data class of each application 515), vehicle location, selection logic, network identity (e.g., which of a number of known networks are currently available, or are predicted to be available during the applicable data transfer window), network configuration (e.g., the type, bandwidth, speed, and/or carrier of the network), system constraints, time of the day or week, and network cost structure. Selection logic can be logic driven by business relationships and parameters. To illustrate, a vehicle manager may have a business relationship with a certain franchise (e.g., a common coffee shop) that allows its vehicles to transfer data for free over their WiFi, while this same relationship may not apply to other establishments with WiFi. System constraints may be technical issues such as storage space. If storage is getting full, the vehicle may be forced to empty data from the storage (or at least partially empty the storage) by transferring data even though the vehicle is connected to a more expensive network. The selection logic can dictate use of the free WiFi at the certain franchise, can represent the data transfer preferences resulting from other such business relationships, can account for current network cost structures, and can also accommodate system constraints.

With respect to network cost structure, the network data optimizer 520 can receive differentiated pricing information as described above, and for non-differentiated networks can include a database or mapping of known available data transfer networks and their associated cost(s). For example, some networks may have fixed costs for data transfer, while the cost of using some networks can vary according to certain parameters including time of day, day of the week, promotionals, special business relationships between the vehicle manager and the network carrier, region of access to the network, and type/amount of data transferred, to name a few examples. The network data optimizer 520 can be provided with and maintain an updated database reflecting these costs. In some implementations, other network usage parameters can be optimized by the network data optimizer 520 instead of or in addition to cost, and such parameters may be maintained by the network data optimizer 520.

The network data optimizer 520 can use the inputs and its timing prediction logic (for example, programmed selection algorithm or a trained deep neural network) to determine when to send the start and stop signals to each engaged application. For example, returning to the example of FIG. 3, the network data optimizer 520 can analyze the route 310, identify the expected location 315 of the vehicle 120 during the applicable data transfer window, determine that networks A, B, and C will be available during this window, and select the least expensive one (or combination) of these networks for initiating and/or completing the data transfer. As such, the network data optimizer 520 functions as a third party arbitrator between the applications 515 and the network hardware (e.g., WiFi transceiver 212, modems 1-N).

In some implementations, the network data optimizer 520 can weigh data priority versus network cost continuously, periodically, and/or when different network changes are detected. The network data optimizer 520 can then instruct some or all applications whose data priority outweighs the current network cost to start their data transfers. The network data optimizer 520 can also instruct some or all applications whose data priority under-weighs the current network cost to stop their ongoing data transfers, if any. The network data optimizer 520 can send these start/stop notifications to all applications that are currently engaged, for example any time one or more of the inputs 505 change.

The network data optimizer 520 can be implemented using a deep-learning algorithm trained to achieve the lowest cost possible through diligent management of the start/stop notifications. In applicable scenarios, the network data optimizer 520 can also predict upcoming events. For example, based on vehicle navigation inputs (e.g., known route/destination, current GPS location, speed limits, vehicle speed trends, predicted vehicle trajectory), the network data optimizer 520 can predict that the vehicle may enter a higher cost network in the next 30 minutes and hence proactively instruct all applications whose deadline could come up in the higher cost zone to transmit their data before the vehicle enters the higher cost zone. This way, the network data optimizer 520 can decrease the probability of any data transfers occurring in the higher cost zone. It will be appreciated that on-demand applications, such as user-requested media streaming and navigational updates (e.g., GPS location, traffic conditions), may continue data transfers even in the higher cost zone.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A connected vehicle, comprising:
at least one transceiver configured to connect to wireless networks; and
a computing system configured to execute a network connection manager, wherein the network connection manager is configured by computer-executable instructions to at least:
receive user data from a user application;
receive battery data and battery data parameters from a vehicle battery system, the battery data parameters including a battery data transfer window indicating a time window during which the battery data must be transmitted;
identify at least first and second wireless networks that are available for the connected vehicle to use for transferring data;
determine a first availability window for the first wireless network indicating a time during which the first network is available for the connected vehicle to use for transferring data;
determine a second availability window for the second wireless network indicating a time window during which the second network is available for the connected vehicle to use for transferring data;
receive first differentiated pricing information from the first wireless network, the first differentiated pricing information indicating a first cost of transferring data over the first wireless network, the first cost determined based on a current load on the first wireless network;
receive second differentiated pricing information from the second wireless network, the second differentiated pricing information indicating a second cost of transferring data over the second wireless network, the second cost determined based on a current load on the second wireless network;
identify, based on the first and second costs, which one of the first and second wireless networks that corresponds to a lowest cost;
identify, based on the first and second availability windows, which one of the first and second wireless networks that corresponds to a highest availability during the battery data transfer window;
configure the at least one transceiver to transfer the user data over the one of the first and second wireless networks that corresponds to the lowest cost; and
configure the at least one transceiver to transfer the battery data over the one of the first and second wireless networks that corresponds to the most availability during the battery data transfer window.

2. The connected vehicle networking system of claim 1, wherein the network connection manager is configured to at least:
configure the at least one transceiver at a first time;
determine, at a second time after the first time, that the first and second wireless networks are still available for the connected vehicle to use for transferring data;
receive updated differentiated pricing information from one or both of the first and second wireless networks;
determine, based on the updated differentiated pricing information, which of the first and second networks corresponds to the lowest cost at the second time; and
reconfigure the at least one transceiver to transfer the user data over the one of the first and second wireless networks that corresponds to the lowest cost at the second time.

3. The connected vehicle networking system of claim 1, wherein the network connection manager is configured to at least:
continue to identify and analyze pricing of various wireless networks that become available as the connected vehicle navigates along a route; and
at various points in time, select from among the various wireless networks based on current differentiated pricing information.

4. A computer-implemented method, comprising:
receiving differentiated pricing information from a plurality of wireless networks that are available for a connected vehicle to use for transferring data, the differentiated pricing information for a particular wireless network determined based on a current load on the particular wireless network and indicating a cost of transferring data over the particular wireless network;
determining availability information from the plurality of wireless networks, the availability information indicating a time window during which a particular wireless network is available for the connected vehicle to use for transferring data;
receiving user data from a user application;
receiving battery data and battery data parameters from a vehicle battery system, the battery data parameters including a battery data transfer window indicating a time window during which the battery data must be transmitted;
based on the differentiated pricing information, selecting a wireless network from among the plurality of wireless networks that corresponds to a lowest cost;
based on the availability information, selecting a wireless network from among the plurality of wireless networks that corresponds to a highest availability during the battery data transfer window;
configuring the connected vehicle to transfer the user data over the selected wireless network that corresponds to the lowest cost; and
configuring the connected vehicle to transfer the battery data over the selected wireless network that corresponds to the highest availability during the battery data transfer window.

5. The computer-implemented method of claim 4, further comprising causing transfer of the user data over the selected wireless network that corresponds to the lowest cost, and transfer of the battery data over the selected wireless network that corresponds to the highest availability during the battery data transfer window.

6. The computer-implemented method of claim 5, further comprising:
receiving updated differentiated pricing information from at least one of the plurality of wireless networks or a new wireless networks;
based on the updated differentiated pricing information, selecting an updated wireless network that corresponds to the lowest cost; and
continuing the transfer of data using the updated wireless network.

7. The connected vehicle of claim 1, wherein: the first wireless network is identified as corresponding to the lowest cost;
the second wireless network is identified as corresponding to the highest availability during the battery data transfer window; and
the at least one transceiver is configured to simultaneously transfer the user data over the first wireless network and transfer the battery data over the second wireless network.

8. The connected vehicle of claim 1, wherein the battery data includes battery temperature information.

9. The method of claim 5, wherein:
the selected wireless network that corresponds to the lowest cost is different from the selected wireless network that corresponds to the highest availability during the battery data transfer window and the transfer of the battery user is simultaneous with the transfer of the battery data.

10. The method of claim 4, wherein the battery data includes battery temperature information.

* * * * *